(12) United States Patent
Okahara

(10) Patent No.: US 6,220,985 B1
(45) Date of Patent: Apr. 24, 2001

(54) SPEED CHANGE RATIO CONTROLLER FOR STEPLESS AUTOMATIC TRANSMISSION

(75) Inventor: Hirofumi Okahara, Isehara (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 08/795,649

(22) Filed: Feb. 6, 1997

(30) Foreign Application Priority Data

Feb. 8, 1996 (JP) .................................................. 8-022373

(51) Int. Cl.<sup>7</sup> ....................................................... F16H 9/00
(52) U.S. Cl. ................................ 477/46; 180/197; 477/48
(58) Field of Search .................................. 477/45, 46, 48; 180/197; 701/65, 71, 83

(56) References Cited

U.S. PATENT DOCUMENTS

| | | | |
|---|---|---|---|
| 4,545,265 | * | 10/1985 | Abo et al. ................................ 477/48 |
| 4,885,693 | * | 12/1989 | Imanaka et al. .................. 180/197 X |
| 4,995,470 | * | 2/1991 | Yamaguchi et al. .................. 180/197 |
| 5,001,943 | * | 3/1991 | Fujita .................................... 180/197 |
| 5,012,910 | * | 5/1991 | Miyawaki ............................. 192/4 A |
| 5,069,086 | * | 12/1991 | Murano et al. ......................... 477/48 |
| 5,077,672 | * | 12/1991 | Nobimoto et al. ............... 180/197 X |
| 5,178,044 | * | 1/1993 | Suzuki et al. ...................... 477/48 X |
| 5,218,541 | * | 6/1993 | Sakakibara et al. ................... 701/65 |
| 5,383,125 | * | 1/1995 | Hibi ................................. 180/197 X |
| 5,658,216 | * | 8/1997 | Ochiai .................................... 477/46 |

FOREIGN PATENT DOCUMENTS

| | | |
|---|---|---|
| 2 222 645 | * 3/1990 | (GB) . |
| 61-105353 | 5/1986 | (JP) . |
| 6-185608 | 8/1994 | (JP) . |
| 8-178055 | 7/1996 | (JP) . |

* cited by examiner

Primary Examiner—David A. Bucci
Assistant Examiner—William C Joyce
(74) Attorney, Agent, or Firm—Foley & Lardner

(57) ABSTRACT

A speed change ratio of a stepless transmission of a vehicle is controlled so as to decrease the greater the vehicle speed, but this control of speed change ratio is suppressed when the drive wheels are slipping. This prevents misinterpretation of the slipping of the drive wheels as an increase of vehicle speed, and prevents shift-up of the transmission when the drive wheels are slipping.

10 Claims, 4 Drawing Sheets

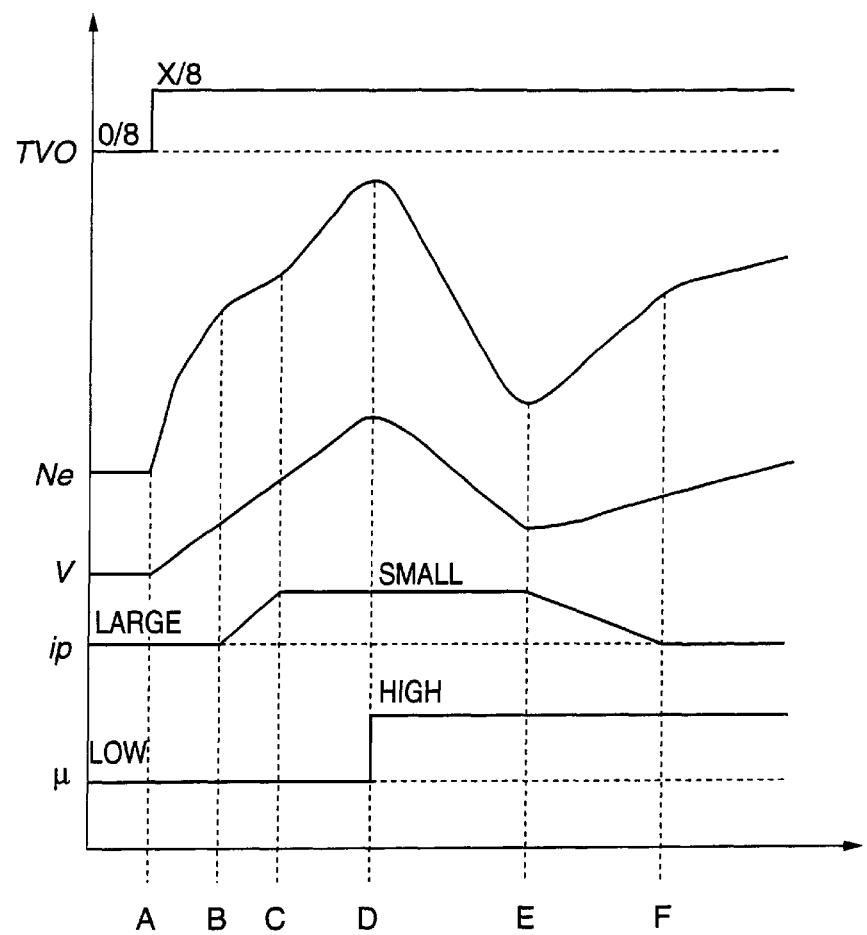

SPEED CHANGE RATIO CONTROLLER FOR STEPLESS AUTOMATIC TRANSMISSION

FIELD OF THE INVENTION

This invention relates to speed control of a stepless automatic transmission.

BACKGROUND OF THE INVENTION

A transmission system for a vehicle using a combination of a fluid transmission such as a torque converter or fluid coupling, and a stepless transmission which transmits the output torque of the fluid transmission via a V-belt or variable pulley to a vehicle drive shaft after changing the speed in a stepless manner, is disclosed in Tokkai Sho 61-105353 published by the Japanese Patent Office in 1986. A speed change ratio of this stepless transmission is controlled by a controller, and generally varies according to a throttle opening and vehicle speed which represent the acceleration requirement of the driver. Regarding vehicle speed, the higher the vehicle speed, the more the transmission shifts up, i.e., the more the speed change ratio is reduced.

However in some cases, for example when the vehicle start abruptly or when the vehicle starts and accelerates on a road surface which is of a low frictional coefficient, this type of controller may vary the speed change ratio very rapidly when the vehicle skids. As a result, the V-belt or variable pulley may slip, shocks may occur, the driver may experience a feeling of unpleasantness and the controller may suffer wear. This is due to the fact that in general, the vehicle speed is detected from the rotation speed of the drive system, e.g. the drive shaft. In other words, when the drive wheels slip, the speed change controller determines that the vehicle speed has increased, and therefore shifts up. Subsequently, when the drive wheels regain their grip on the road and stop slipping, the controller determines that there has been a sudden drop in vehicle speed. It therefore performs a rapid shift-down and the speed change ratio sharply increases. This causes frictional parts such as belts in the controller to slip, and a shock is produced.

SUMMARY OF THE INVENTION

It is therefore an object of this invention to prevent a rapid change of speed change ratio when drive wheels slip.

It is a further object of this invention to change over between speed change control when the drive wheels slip and normal speed change control with appropriate timing.

In order to achieve the above objects, this invention provides a speed change ratio controller for use with a stepless automatic transmission which transmits a torque of an engine to drive wheels of a vehicle at an arbitrary speed change ratio. The controller comprises a mechanism for detecting a travel speed of the vehicle, a mechanism for controlling the transmission such that the speed change ratio decreases the more the travel speed increases, a mechanism for detecting slip of the drive wheels, and a mechanism for suppressing decrease of a speed change ratio of the transmission by the control mechanism when the slip is detected.

It is also preferable that the controller further comprises a mechanism for detecting an engine rotation speed, and a mechanism for stopping suppression of the speed change by the suppressing mechanism when the rotation speed exceeds a predetermined value.

It is also preferable that the controller further comprises a mechanism for detecting an engine throttle opening, and a mechanism for stopping suppression of decrease of the speed change ratio by the suppressing mechanism when the throttle opening is decreasing.

It is also preferable that the controller further comprises a mechanism for detecting an engine throttle opening, a timer mechanism for measuring an elapsed time from when the throttle opening starts to decrease, and a mechanism for stopping suppression of decrease of the speed change ratio by the suppressing mechanism when the elapsed time exceeds a predetermined value.

It is also preferable that the controller further comprises a mechanism for determining whether or not the travel speed has increased, and a mechanism for stopping suppression of decrease of the speed change ratio by the suppressing mechanism when the travel speed has increased again after the suppression.

In this case, it is further preferable that the controller further comprises a mechanism for gradually changing a speed change ratio to a speed change ratio which is given by the controlling mechanism when the suppression has stopped.

It is also preferable that the slip condition detecting mechanism comprises a mechanism for detecting a rotation speed of the drive wheels, a mechanism for detecting a rotation speed of non-drive wheels of the vehicle, and a mechanism for determining that slip has occurred when a difference between the rotation speeds of the drive wheels and non-drive wheels is greater than a predetermined value.

The details as well as other features and advantages of this invention are set forth in the remainder of the specification and are shown in the accompanying drawings.

BRIEF DESCRIPTION OF THE DRAWINGS

FIGS. 4A–4E are timing charts showing the results of the speed control process.

DESCRIPTION OF THE PREFERRED EMBODIMENTS

Figure 1:
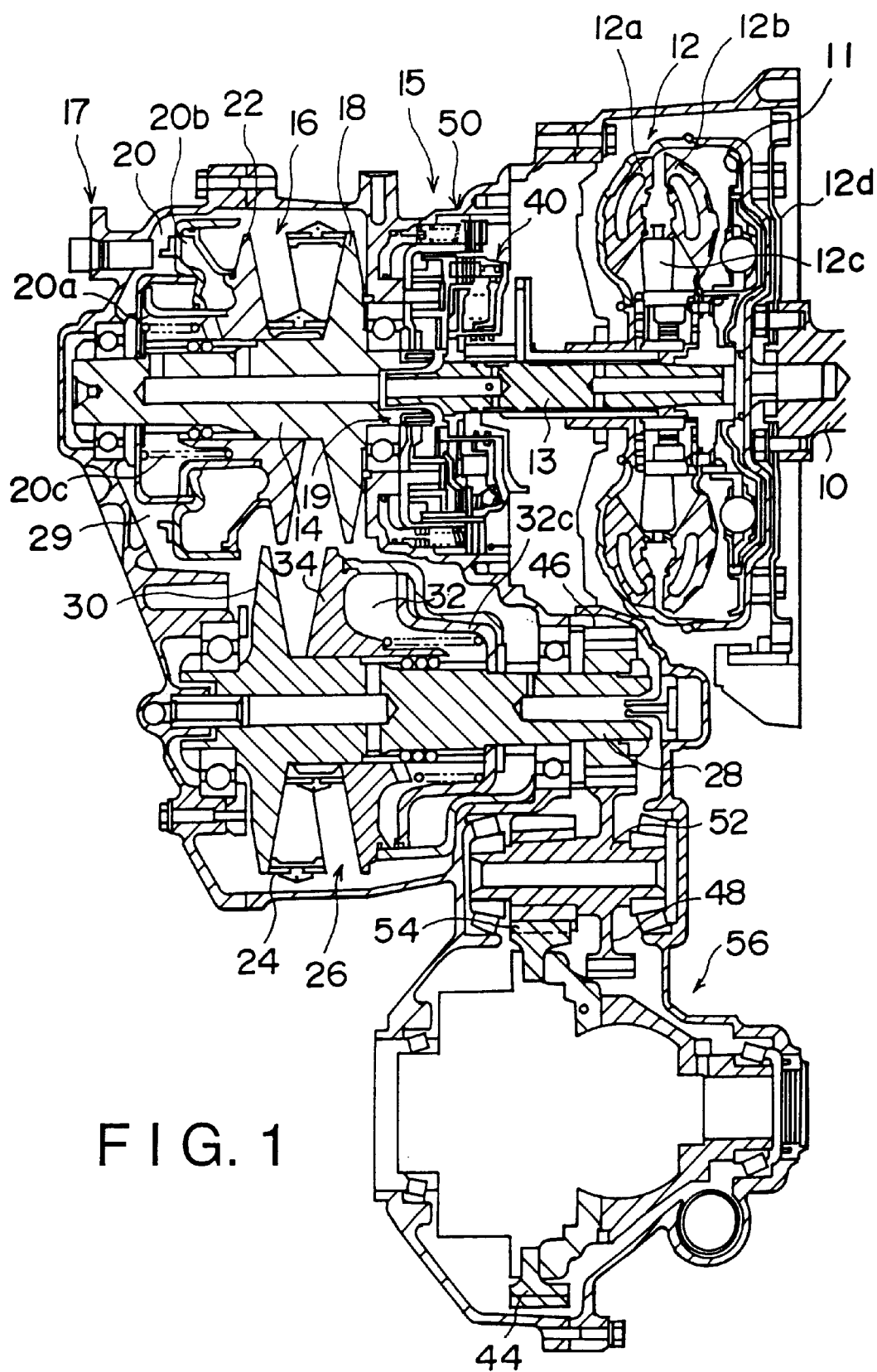
FIG. 1 is a longitudinal sectional view of a stepless automatic transmission and torque converter to which this invention is applied.

Referring to FIG. 1 of the drawings, a torque converter 12 is connected to an engine output shaft 10.

The torque converter 12 comprises a lockup clutch 11. The lockup clutch 11 mechanically connects or disconnects an impeller 12a which is an input part and a turbine 12b which is an output part according to the oil pressure supplied to a converter chamber 12c and a lockup oil chamber 12d.

The turbine 12b is connected to a rotation shaft 13, the rotation shaft 13 being connected to a forward/reverse change-over mechanism 15. The mechanism 15 comprises a planetary gear mechanism 19, forward clutch 40 and reverse brake 50. The output shaft of the mechanism 19 is connected to a drive shaft 14 formed coaxially with the rotation shaft 13. The drive shaft 14 comprises the input shaft of a continuously variable transmission (CVT) 17. It should be noted that a fluid coupling or an electromagnetic clutch may be used instead of the torque converter 12.

The CVT 17 comprises a drive pulley 16 and driven pulley 26, and a V-belt 24 which transmits the rotation of the drive pulley 16 to the driven pulley 26, as described hereinabove.

The drive pulley 16 comprises a fixed conical plate 18 which rotates together with the drive shaft 14 and a movable conical plate 22 disposed relative to the fixed conical plate 18 forming a V-shaped pulley groove with the fixed conical plate 18. The movable conical plate 22 moves in the axial direction of the drive shaft 14 according to an oil pressure acting on a drive pulley cylinder chamber 20 while it rotates with the fixed conical plate 18. The drive pulley cylinder chamber 20 comprises a chamber 20a and chamber 20b. The movable conical plate 22 has a pressure receiving surface larger that of a movable conical plate 34 described hereinafter.

The driven pulley 26 is installed on a driven shaft 28. The driven pulley 26 comprises a fixed conical plate 30 which rotates together with the driven shaft 28 and a movable conical plate 34 disposed relative to the fixed conical plate 30 forming a V-shaped pulley groove with the fixed conical plate 30. The movable conical plate 34 moves in the axial direction of the driven shaft 28 according to an oil pressure acting on a driven pulley cylinder chamber 32 while it rotates with the fixed conical plated 30.

The driven pulley 26 is provided with a drive gear 46 which rotates together with the pulley 26. The drive gear 46 engages with an idler gear 48 on an idler shaft 52. The idler shaft 52 comprises a pinion gear 54 which rotates together with the shaft 52. The pinion gear 54 engages with a final gear 44. The final gear 44 drives a propeller shaft or drive shaft, not shown, via a differential unit 56.

The rotation input to the CVT 17 from the engine output shaft 10 is transmitted to the forward/reverse change-over mechanism 15 via the torque converter 12 and rotation shaft 13. When the forward clutch 40 is engaged and the reverse brake 50 is released, the rotation of the rotation shaft 13 is transmitted to the drive shaft 14 of the transmission 17 with the same rotation direction via the planetary gear mechanism 19 whereof the input shaft and output shaft rotate together. On the other hand, when the forward clutch 40 is released and the reverse brake 50 is engaged, the rotation of the rotation shaft 13 is transmitted to the drive shaft 14 with the opposite rotation direction due to the action of the planetary gear mechanism 19.

The rotation of the drive shaft 14 is transmitted to the differential unit 56 drive pulley 16, V-belt 24, driven pulley 26, driven shaft 28, drive gear 46, idler gear 48, idler shaft 52, pinion gear 54 and final gear 44. When the forward clutch 40 and reverse brake 50 are both released, the forward/reverse change-over mechanism 15 goes into neutral, and transmission of a rotation from the rotation shaft 13 to the drive shaft 14 does not occur.

In the aforesaid dynamic transmission, the rotation ratio, i.e. speed change ratio (deceleration ratio) between the drive pulley 16 and driven pulley 26 varies when the movable conical plate 22 of the drive pulley 16 and movable conical plate 34 of the driven pulley 26 are moved in axial direction so as to alter the contact point radius with the V-belt 24. For example, if the width of the V-shaped pulley groove of the drive pulley 16 is enlarged and the width of the V-shaped pulley groove of the driven pulley 26 is narrowed, the contact point radius of the V-belt 24 on the side of the drive pulley 16 decreases and the contact point radius of the V-belt 24 on the side of the driven pulley 24 increases, so a large deceleration ratio is obtained. When the movable conical plates 22, 34 are moved in the opposite direction, the deceleration ratio becomes smaller.

This control of the widths of the V-shaped pulley grooves of the drive pulley 16 and driven pulley 26 is performed by controlling the relative pressures of the drive pulley cylinder chamber 20 (20a, 20b) and driven pulley cylinder chamber 32 via a control system described hereinafter.

Figure 2:
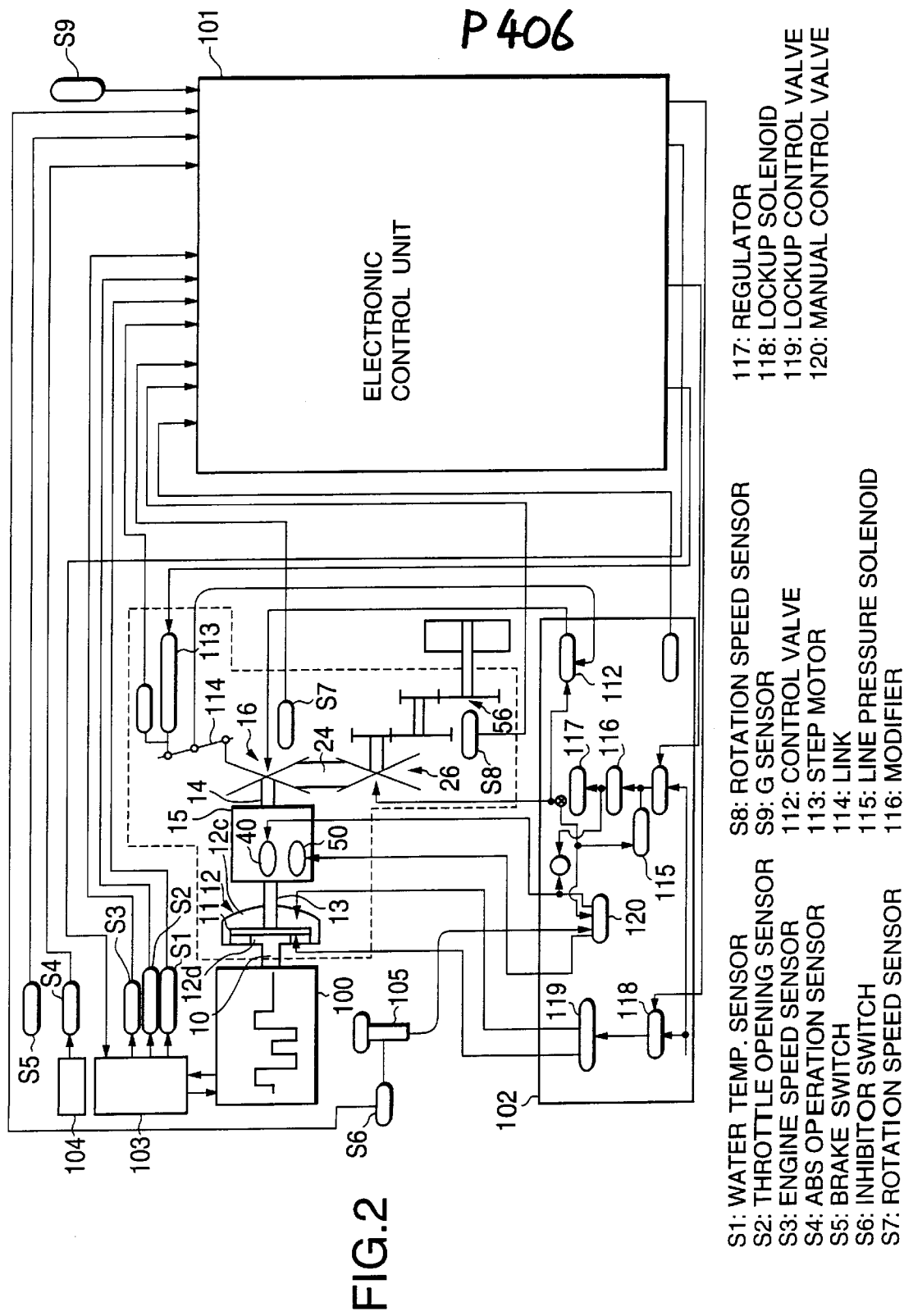
FIG. 2 is a block diagram showing the construction of a controller according to this invention.
Figure 3:
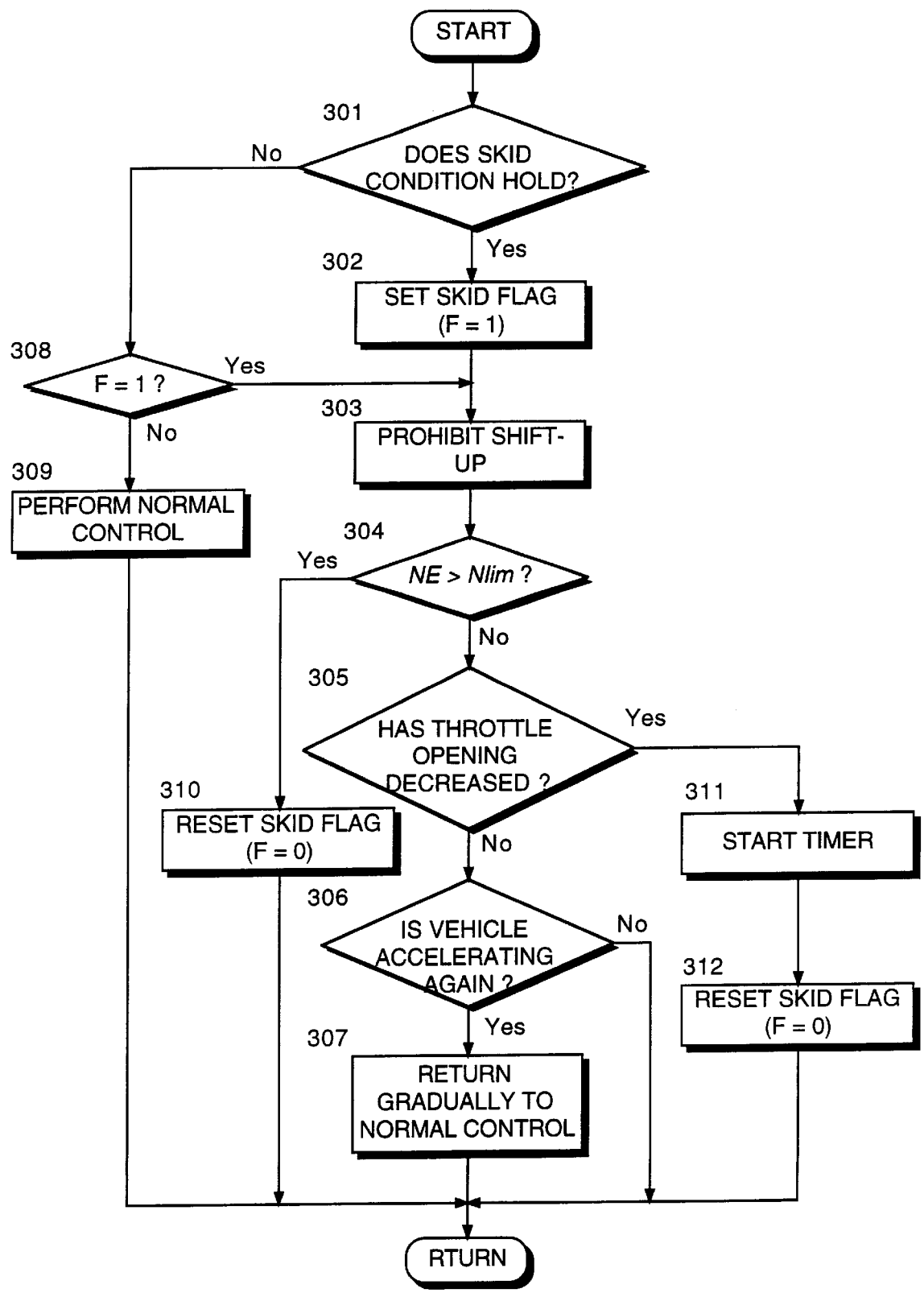
FIG. 3 is a flow chart describing a speed control process according to this invention.

The rotation ratio of the CVT 17 is controlled by the control unit shown in FIG. 2. The same symbols are used as for the mechanism in FIG. 1.

In FIG. 2, 101 is an electronic control unit comprising a microprocessor, and 102 denotes a hydraulic control unit comprising various oil pressure control valves. In this control system, the main means of controlling the aforesaid CVT are the electronic control unit 101 and the hydraulic control unit 102.

The electronic control unit 101 is a microcomputer comprising a central processing unit (CPU), read-only memory (ROM), random access memory (RAM) and input/output interface. Signals are input to the electronic control unit 101 from a water temperature sensor S1, throttle opening sensor S2, engine rotation speed sensor S3, ABS operation sensor S4 which detects the operation of an antilock braking system (ABS) controller 104, brake switch S5 which turns on according to the braking of the vehicle, inhibitor switch S6 showing the operating position of a selector lever 105, rotation speed sensor S7 which detects the rotation speed of the drive pulley 16, and a rotation speed sensor S8 which detects the rotation speed of the driven pulley 26.

The electronic control unit 101 performs predetermined calculations using these signals so as to control the speed change ratio of the CVT 17, line pressure and lock up clutch 11.

Describing these control functions in detail, the electronic control unit 101 outputs a drive signal to a step motor 113 based on a predetermined pattern according to engine load, engine rotation speed and vehicle speed represented by the throttle opening. The throttle opening is detected by a throttle opening sensor S2, the engine rotation speed is detected by an engine rotation speed sensor S3, and the vehicle speed is detected by a rotation speed sensor S8 which detects the rotation speed of the driven pulley 26.

The step motor 113 drives a speed control valve 112 of an oil pressure control unit 102 so that a speed change ratio corresponding to this drive signal is obtained, controls the line pressure supplied to the drive pulley cylinder chamber 20 shown in FIG. 1, and varies the relative pressures of the drive pulley cylinder chamber 20 and driven pulley cylinder chamber 32.

The displacement position of the drive belt pulley 16, i.e. the speed change ratio, is fed back to the speed control valve 112 via a link 114. After a target speed change ratio corresponding to the position of the step motor 113 is achieved by this feedback control, the electronic control unit 101 fixes the relative pressures of the pulley cylinder chambers 20 and 32 so as to maintain the speed change ratio.

When the line pressure acting on the pulleys 16 and 26 is too small in the speed change ratio control of the CVT 17, the frictional force between the pulleys 16,18 and V-belt 24 is insufficient so the V-belt 24 slips. Conversely when the line pressure is too large, the frictional force increases uselessly. In both cases, this has an adverse effect on fuel costs and the driving performance of the vehicle. The line pressure is therefore controlled so that a suitable drive force which is neither too large nor too small is transmitted according to the driving conditions.

The electronic control unit 101 controls the position of a line pressure solenoid 115 of the oil pressure control unit 102 according to a control signal. After the line pressure solenoid 115 has adjusted the oil pressure pump, not shown, to a suitable line pressure via a modifier (pressure control valve) 116 and regulator (fixed pressure valve) 117, this line pressure is supplied to the driven pulley cylinder chamber 32. It is also supplied to the driven pulley cylinder chamber 20 via a speed change control valve 112. Also, control is performed so that the lockup clutch 11 is connected when for example the vehicle speed is greater than a predetermined value, and released when it is less than the predetermined value.

The electronic control unit 101 outputs a signal according to the vehicle speed to a lock up solenoid 118 of the oil pressure control unit 102, and thereby switches over a lock up control-valve 119. The lockup control-valve 119 switches over between a system which supplies the pressure of the oil pump to the converter chamber 12c of the torque converter 12 as an applied pressure of the lockup clutch 11 so releasing a lockup oil chamber 12d, and a system which supplies the oil pressure of the oil pump to the lockup oil chamber 12d as a release pressure so releasing the converter chamber 12c.

A manual control valve 120 which operates in synchronism with a selector lever 105 is provided in the oil pressure control unit 102. The manual control valve 120 supplies oil pressure which is supplied from the oil pressure pump via the line pressure solenoid 115, selectively to a forward clutch 40 and reverse clutch of a forward/reverse change-over mechanism 15 according to the operating position of the selector lever 105. This permits the forward/reverse change-over mechanism 15 to be changed between the forward, reverse and neutral positions.

The above CVT and the basic construction of its controller are described in for example Tokkai Hei 8-178055 published by the Japanese Patent Office.

This invention suppresses shift-up when the drive wheels slip in such a continuous automatic speed change controller. In the following description, the drive wheels means wheels to which a drive torque is transmitted from the CVT 17, and the non-drive wheels means wheels to which a drive torque is not transmitted from the CVT 17 and which rotate due to contact with the road surface.

Slipping of the drive wheels may be determined also, for example, from the difference of rotation speed of the drive wheels and non-drive wheels. However according to this embodiment, control response and efficiency are enhanced by predicting slipping before it occurs from the acceleration of the vehicle. A drive wheel rotation speed sensor S10 and a non-drive wheel rotation speed sensor S11 may be further provided and connected to the electronic control unit 101 as shown in FIG. 1 to accomplish this determination.

When it is predicted in the step 301 that slipping will occur, a slip flag F is set in a step 302 showing that the drive wheels are likely to slip, and in a step 303, a command is issued to prohibit shift-up. The speed change ratio of the CVT is then fixed at the speed change ratio when it has been determined that the wheels are going to slip.

In this case however, there is a risk that if the driver continues pressing on the accelerator, the engine rotation speed Ne may exceed a permitted value Nlim.

When it is found that this is the case in a step 304, the slip flag F is reset to 0 in a step 310 so that the routine returns to normal speed change control and shifts the speed change ratio up.

When Ne is equal to or less than Nlim, it is determined in a step 305 whether or not the throttle opening has decreased due to the driver's operation of the accelerator.

When the throttle opening decreases in the step 305, it is predicted that the drive wheels are no longer slipping due to a decrease of drive torque. In this case, the slip flag F is reset to 0 in a step 312, the speed change ratio is released from its fixed value, and the routine returns to normal speed change ratio control.

However the return of normal speed change ratio control should be made after the drive wheels have stopped slipping. Therefore, the process only proceeds to the step 312 after a predetermined time has elapsed. When the throttle opening has not decreased in the step 305, it is determined in a step 306 whether or not the vehicle is accelerating again, for example based on the vehicle speed detected by the rotation speed sensor S8. The fact that the vehicle has started accelerating again means that the drive wheels are no longer slipping due to an increase of road surface friction, and that the drive wheels have regained their grip. In this case therefore, the fixed gear ratio control is released and a return is made to normal speed change ratio control. However, the speed change ratio Is made to return to the normal ratio slowly in step 307 so that the speed change is smooth.

FIGS. 4A–4E show an example of control characteristics under actual running conditions according to the aforesaid control process.

These timing charts show the variation of engine rotation speed Ne, vehicle speed V and speed change ratio ip when the accelerator pedal is sharply depressed so that the throttle opening changes from 0/8, which is its value when the vehicle stops, to a certain opening X/8, and this opening is maintained thereafter.

The point A is the point where the vehicle starts to accelerate from rest. After startup, the vehicle speed V increases to a certain extent so as to reach a point B, and the speed change ratio ip varies in the shift-up direction, i.e. the speed change ratio decreases. When, at a point C, it is predicted that the wheels will slip or detected that they are slipping, the speed change ratio ip is fixed at the speed change ratio at that time. At a point D, the friction u with the road surface on which the vehicle is traveling increases, and the slipping of the wheels decreases thereafter due to the increased friction. As a result, the engine speed Ne and vehicle speed V both decrease as the drive wheels regain their grip. The reason for this decrease of the engine speed Ne and vehicle speed V is due to the increase of frictional resistance when grip is restored.

At a certain point when grip has been restored, the drive wheels effectively stop slipping, and the vehicle starts accelerating again. At this point E, the speed change ratio is released from its fixed value due to the re-acceleration, and the speed change ratio smoothly varies in the shift-down direction up to a point F when it reaches a ratio corresponding to the throttle opening and vehicle speed.

In this way, when the drive wheels slip, shift-up of CVT is suppressed until the engine rotation speed, throttle opening or re-acceleration of the vehicle satisfy predetermined conditions. According to the prior art controller, however, it is incorrectly determined that the increased rotation speed of the drive wheels due to slipping means the vehicle is accelerating, and shift-up of CVT is performed. It is also incorrectly determined that the decreased rotation speed of the drive wheels when grip is recovered after slipping means the vehicle is decelerating, and shift-down of CVT is performed.

The CVT controller according to this invention is free from these malfunctions. The friction parts such as the V-belt 24 of the CVT 17 do not slip and the vehicle suffers no shock when it starts or accelerates because there is no sharp variation of the speed change ratio.

The drivability of the vehicle is therefore improved, and the durability of the speed change controller is also enhanced.

The embodiments of this invention in which an exclusive property or privilege is claimed are defined as follows:

1. A stepless automatic transmission speed change ratio controller for use with a stepless automatic transmission which transmits a torque of an engine to drive wheels of a vehicle at a variable speed change ratio, comprising:

means for detecting a travel speed of the vehicle;

means for controlling said stepless automatic transmission such that the speed change ratio decreases the more the travel speed increases;

means for detecting a slip condition of the drive wheels;

means for suppressing decrease of a speed change ratio of said transmission by said control means responsive to detection of the slip condition;

means for detecting a transition point in time at which said travel speed begins to increase following a decrease of said travel speed without using the slip condition of the drive wheels to detect the transition point in time; and means for discontinuing suppression of decrease of said speed change ratio by said suppressing means at the detected transition point in time.

2. A speed change ratio controller as defined in claim 1, further comprising means for gradually changing a speed change ratio to a speed change ratio which Is given by said controlling means when said suppression has stopped.

3. A speed change ratio controller as defined in claim 1, wherein said slip condition detecting means comprises means for detecting a rotation speed of the drive wheels, means for detecting a rotation speed of non-drive wheels of the vehicle, and means for determining that slip has occurred when a difference between the rotation speeds of the drive wheels and non-drive wheels is greater than a predetermined value.

4. The speed change controller according to claim 1, wherein means for suppressing decrease of a speed change ratio permits increase of the speed change ratio.

5. A stepless automatic transmission speed change ratio controller for use with a stepless automatic transmission which transmits a torque of an engine to drive wheels of a vehicle at a variable speed change ratio, comprising:

means for detecting a travel speed of the vehicle;

means for controlling said stepless automatic transmission such that the speed change ratio decreases the more the travel speed increases;

a drive wheel slip condition detector;

means for suppressing decrease of a speed change ratio of said transmission by said control means responsive to detection of a slip condition by said slip condition detector;

means for detecting a transition point in time at which said travel speed begins to increase following a decrease of said travel speed without using the slip condition of the drive wheels to detect the transition point in time; and means for discontinuing suppression of decrease of said speed change ratio by said suppressing means at the detected transition point in time.

6. A speed change ratio controller as defined in claim 5, further comprising means for gradually changing a speed change ratio to a speed change ratio which is given by said controlling means when said suppression has stopped.

7. A speed change ratio controller as defined in claim 5, wherein said slip condition detector comprises a drive wheel rotation speed detector, a non-drive wheel rotation speed detector, and means for determining that slip has occurred when a difference between the rotation speeds of the drive wheels and non-drive wheels is greater than a predetermined value.

8. The speed change controller according to claim 5, wherein means for suppressing decrease of a speed change ratio permits increase of the speed change ratio.

9. A method for controlling a speed change ratio of a stepless automatic transmission that transmits engine torque to drive wheels of a vehicle at a variable speed change ratio, comprising:

varying said stepless automatic transmission such that the speed change ratio decreases the more the travel speed increases detecting a slip condition of the drive wheels;

suppressing decrease of the speed change ratio upon detecting the slip condition;

detecting a transition point in time at which travel speed of the vehicle begins to increase following a decrease of said travel speed without using the slip condition of the drive wheels to detect the transition point in time; and discontinuing suppression of decrease of said speed change ratio at the detected transition point in time.

10. The method for controlling a speed change ratio according to claim 9, wherein suppressing decrease of the speed change ratio permits increase of the speed change ratio .

* * * * *